US006832468B2

(12) United States Patent
Weinlader

(10) Patent No.: US 6,832,468 B2
(45) Date of Patent: Dec. 21, 2004

(54) LAWN STRIPING METHOD AND APPARATUS

(76) Inventor: J. Keith Weinlader, 337 Ludwell Dr., Lancaster, PA (US) 17601

( * ) Notice: Subject to any disclaimer, the term of this patent is extended or adjusted under 35 U.S.C. 154(b) by 0 days.

(21) Appl. No.: 10/427,184

(22) Filed: Apr. 30, 2003

(65) Prior Publication Data
US 2003/0230067 A1 Dec. 18, 2003

Related U.S. Application Data
(60) Provisional application No. 60/389,259, filed on Jun. 17, 2002.

(51) Int. Cl.[7] ............................................. A01D 67/00
(52) U.S. Cl. ...................................................... 56/320.1
(58) Field of Search ........................... 56/320.1, 16.4 R, 56/320.2, 16.9, 400.14, 10.1, DIG. 12; 172/684.5, 438; 15/78

(56) References Cited

U.S. PATENT DOCUMENTS

| 829,803 A | 8/1906 | Robb | 56/262 |
|---|---|---|---|
| 1,168,713 A | 1/1916 | Cummins | 172/170 |
| 1,291,295 A | 1/1919 | Wagner et al. | 56/255 |
| 1,757,844 A | 5/1930 | Pol | 56/249 |
| 2,143,402 A | * 1/1939 | Baker | 56/249 |
| 2,751,741 A | * 6/1956 | Carson | 56/400.04 |
| 3,525,201 A | 8/1970 | Kaufman | 56/7 |
| 4,989,676 A | 2/1991 | Rogers | 172/438 |
| 5,005,344 A | * 4/1991 | McCracken | 56/14.7 |
| 5,018,587 A | 5/1991 | Gandrud et al. | 172/612 |
| 5,134,838 A | * 8/1992 | Swisher et al. | 56/16.6 |
| 5,228,277 A | 7/1993 | Smith et al. | 56/16.9 |
| 5,477,927 A | 12/1995 | Figura | 172/29 |
| 5,761,894 A | 6/1998 | Evans | 56/320.1 |
| 5,765,348 A | * 6/1998 | Thagard et al. | 56/15.2 |
| 5,833,013 A | 11/1998 | Davis | 172/612 |
| 6,122,904 A | * 9/2000 | Garcia de Alba | 56/16.9 |
| 6,257,345 B1 | 7/2001 | Tozer | 172/199 |

FOREIGN PATENT DOCUMENTS

FR    2637450 A    * 4/1990    .......... A01D/34/70

* cited by examiner

Primary Examiner—Árpád Fab Kovács

(57) ABSTRACT

An attachment for the mower deck of a mower for striping the cut grass, and the method of use thereof. The attachment is a brush adjustably affixed to the rear of the mower deck, behind the cutting blades, and extending perpendicularly across the path of the mower. The brush is adjusted up and down to vary the amount of interference with the cut grass. As the brush is pulled across the lawn behind the cutting blades, it contacts the cut grass blades and bends them over in the direction of travel.

24 Claims, 5 Drawing Sheets

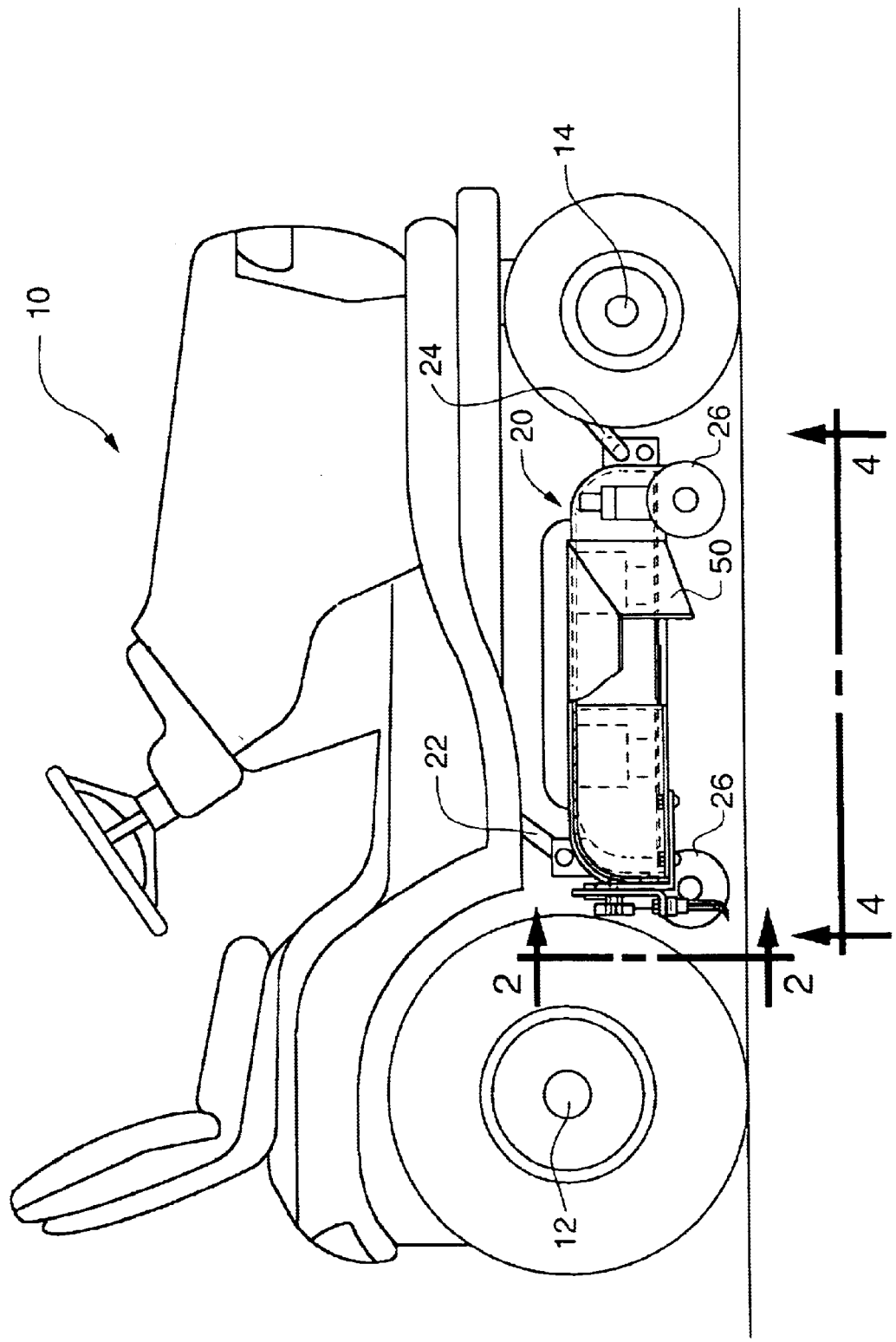

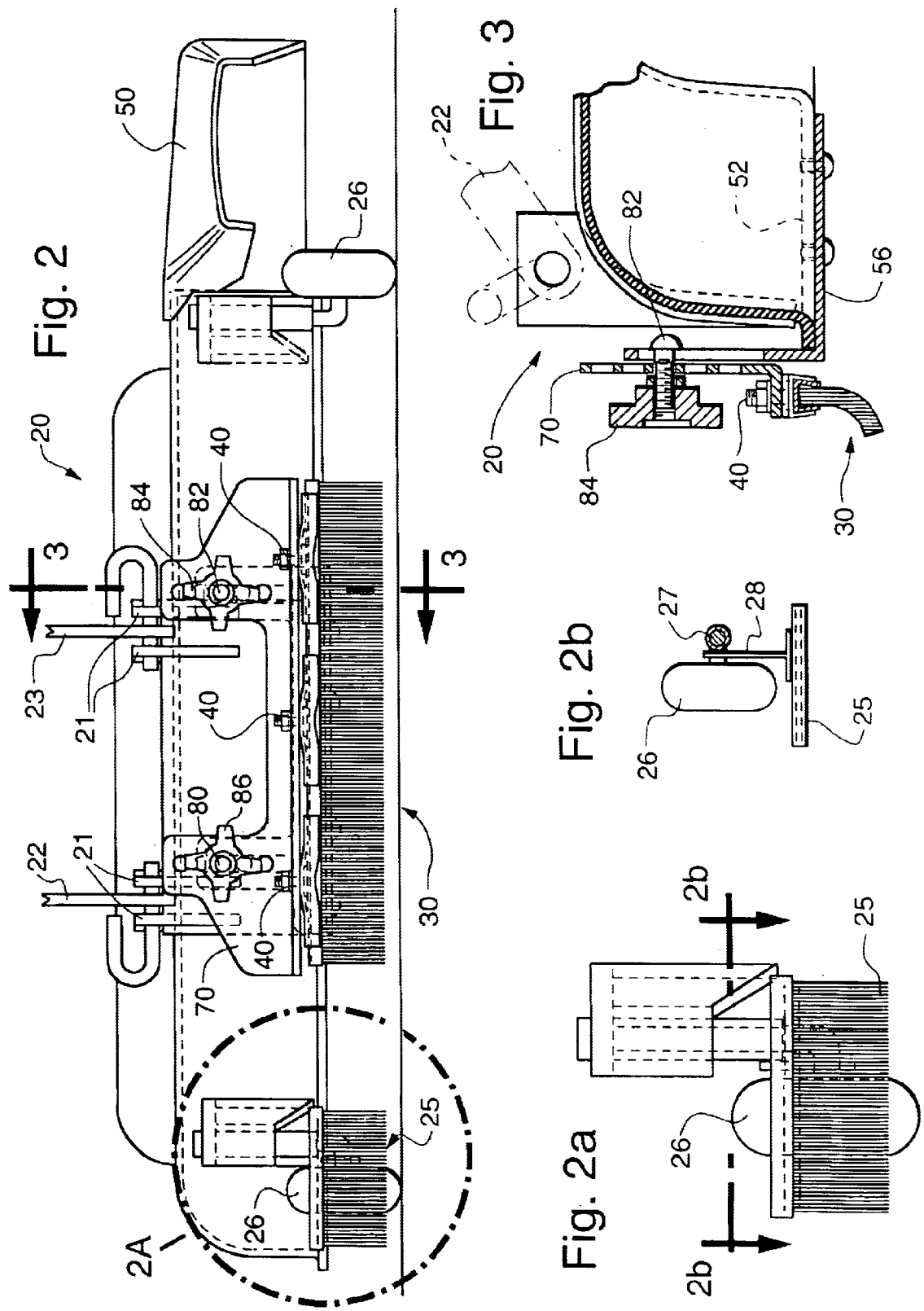

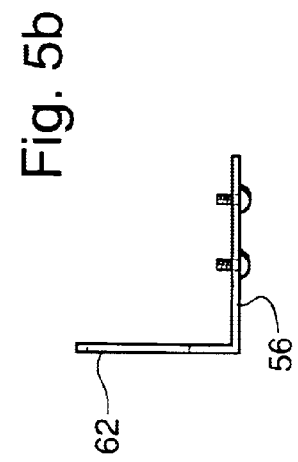
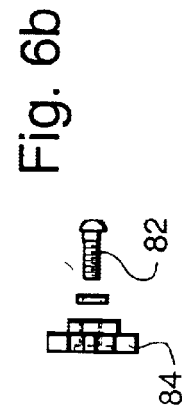
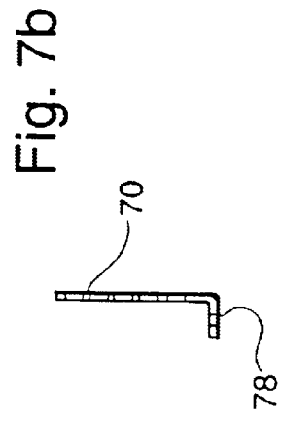
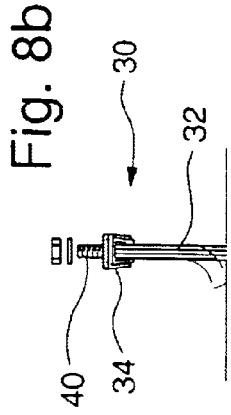
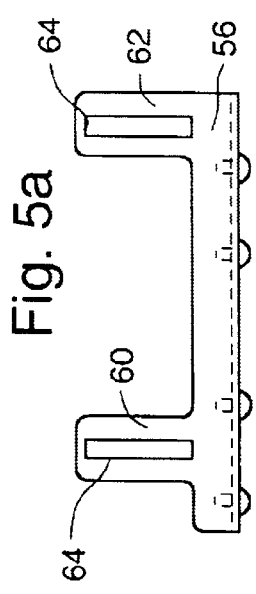
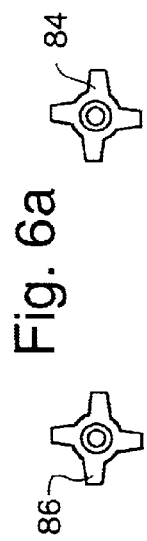
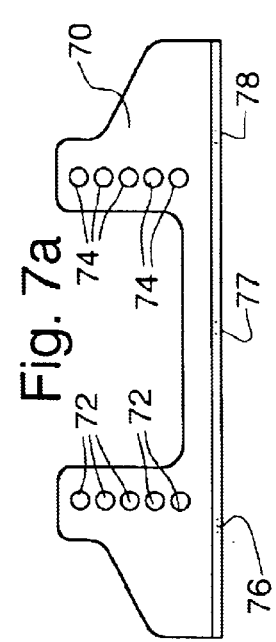
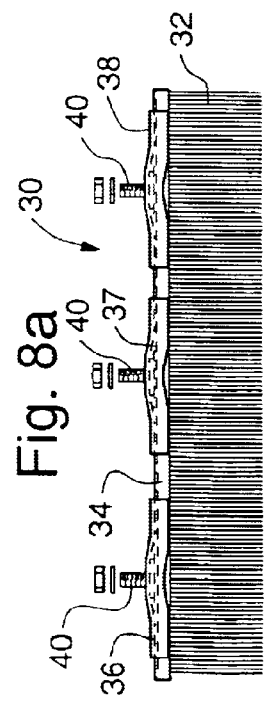

ial patent application is incorporated herein by reference.
LAWN STRIPING METHOD AND APPARATUS

CROSS REFERNCE TO RELATED APPLICATIONS

This application claims priority to provisional patent application 60/389,259 filed on Jun. 17, 2002. The provisional patent application is incorporated herein by reference.

BACKGROUND OF THE INVENTION

The present invention relates generally to lawn striping, and more particularly to an apparatus for striping a lawn that can be added to the deck of a lawn mower. The method of striping a lawn by using such an attachment is also part of the present invention.

Lawn striping is generally considered to have originated in big-league ballparks where groundskeepers have traditionally created checkerboard, diamond and argyle patterns in the field. Now, most golf courses and a growing number of residential housing are employing striping in one manner or another. The residential striping is thought to make a lawn look larger, more elegant, in some cases whimsical, or just well manicured. Depending upon the type of grass, weather and watering conditions, the effect lasts about a week.

Patterns are caused by the way the light reflects off the grass. Grass cut with the grass bent away from you looks lighter while grass cut with the grass blades bent towards you looks darker. While mowing at different heights or fertilizing in alternate areas of the yard can achieve a somewhat similar effect, most professionals have heretofore preferred a method that involves mowing and rolling. Many professional groundskeepers use old-fashioned reel mowers to cut a stadium's grass, with a lawn roller attached just behind the blades of the mower to bend the grass down.

Increasingly, lawn mower manufacturers are manufacturing riding mowers with full-width rollers mounted to the rear of the mower to make striping easier. Except possibly in the case of a very heavy self-propelled walk behind mower, the mower must be a rider, and the roller must support substantially the full weight of the mower so that the pressure forces the grass down and away, in the direction the mower is traveling. The roller is attached to the rear of the mower deck to support the weight of the deck. Sometimes a length of chain is pulled behind the roller-equipped mower to allegedly enhance the effect.

The problems with rollers is that they are relatively expensive to replace and repair, some mowers and mower decks cannot support or be easily adapted to support rollers, and rollers are easily broken on curbs and the like. Furthermore, it is relatively expensive to retrofit existing mowers with deck-mounted roller systems.

SUMMARY OF THE INVENTION

It is an object of the instant invention to provide an attachment for the mower deck of a riding lawn mower that employs a brush to produce a striping effect on the cut grass ("cut grass" referring herein to the blades of grass rooted to the ground after mowing).

It is another object of the instant invention to provide a method of striping a lawn that is simpler and more efficient than similar methods heretofore known.

It is a still further object of the instant invention to provide a lawn mower with a brush attached to a mower deck in such a way as to contact the cut grass blades, bending them in the direction of travel of the mower.

It is a further object of the instant invention to provide a brush attachment for a lawn mower deck that does not cause the mower to "jump" when the direction of travel of the tractor is changed.

It is an even still further object of the instant invention to provide an add-on kit for existing lawn mowers that is easy to attach, simple to adjust, reasonable in cost, and effective to stripe the lawn being mowed.

It is another object of the instant invention to provide an attachment for the mower deck of a lawn mower that is simple in design, easy and quick to repair, replace and adjust, and efficient and effective in use.

These and other objects are obtained by providing an attachment for the mower deck of a mower for striping the cut grass, and the method of use thereof. The attachment includes a brush adjustably affixed to the rear of the mower deck, behind the cutting blades, and extending perpendicularly across the path of the mower. The brush is adjusted up and down to vary the amount of contact, or engagement, with the cut grass. As the brush is pulled across the lawn behind the mower deck, it contacts the cut grass blades and bends them over in the direction of travel of the mower.

BRIEF DESCRIPTION OF THE DRAWINGS

FIG. 1 is a side elevational view of a brush mounted on the mower deck of a tractor;

FIG. 2 is a rear elevational view of the brush and mower deck taken along line 2—2 of FIG. 1;

FIG. 2a is an enlarged view of the deck wheel and brush modification shown in the circle 2a of FIG. 2;

FIG. 2b is a top plan view of the deck wheel and brush taken along line 2b–2b of FIG. 2a;

FIG. 3 is an enlarged sectional view taken along line 3—3 of FIG. 2 showing the relationship of the elements of that particular embodiment to a mower deck;

FIGS. 5a and 5b through FIGS. 8a and 8b are, respectively, rear elevation and side elevation view of the various elements of the embodiment depicted.

DETAILED DESCRIPTION OF THE PREFERRED EMBODIMENT

Figure 4:
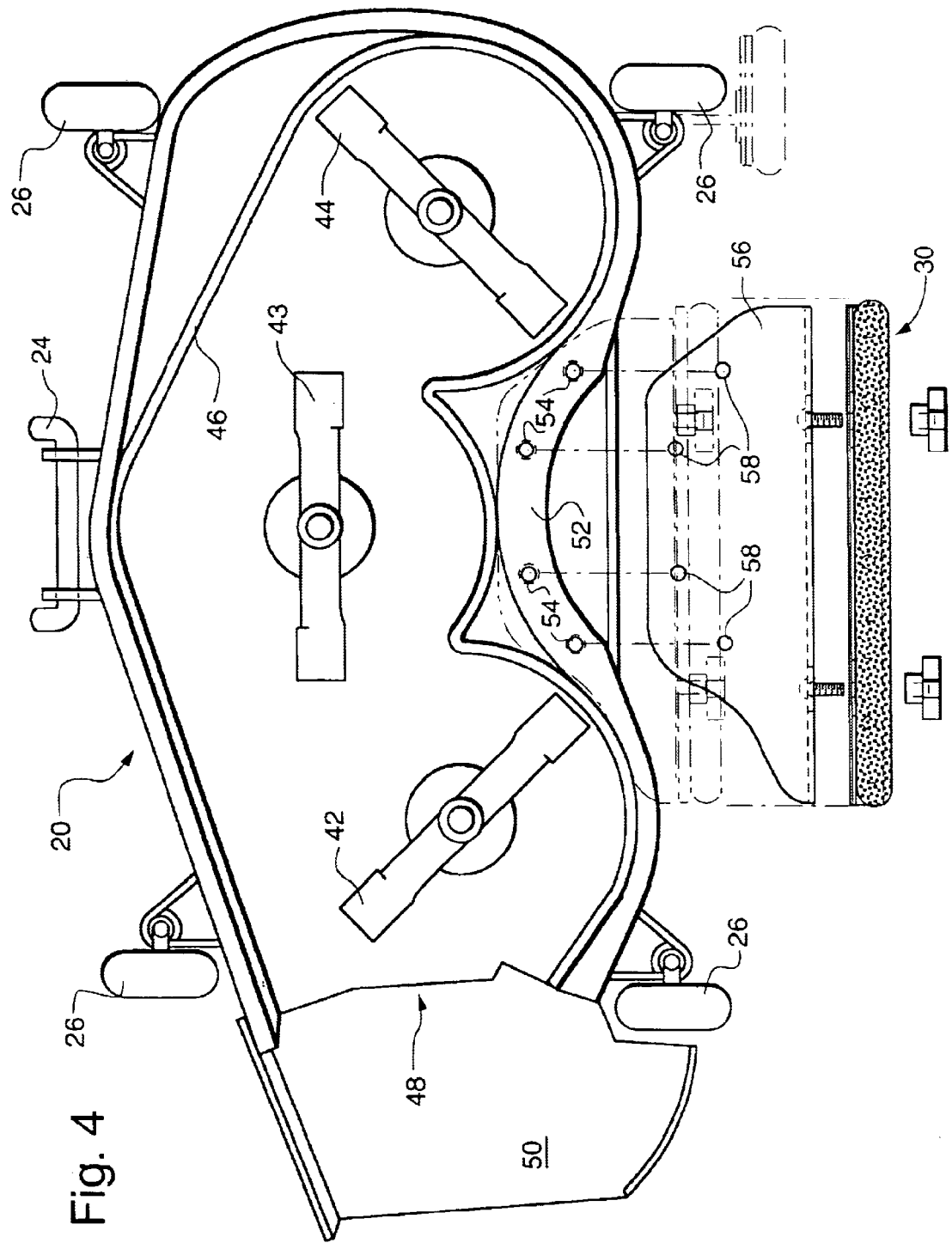
FIG. 4 is a bottom elevational view of the mower deck of FIG. 1 as viewed from line 4—4 of FIG. 1, with parts of the embodiment exploded away from the mower in solid lines and shown in place on the mower deck in phantom lines.

In general terms the instant invention is directed to method and apparatus for striping lawns. More particularly, there will be described and claimed such method and apparatus that employs a brush to bend the cut grass in the direction of travel of the mower, thus producing a striping effect.

The terms "left" and "right", "up" or "upwardly" and "down" or "downwardly" are used herein for clarity and ease of description only. They refer to directions as relate to the machine, setting on the ground, facing in the normal direction of travel while in operation.

The striping brush of the instant invention is adaptable to fit on substantially any lawn mower deck, riding and larger walk behind; however, it works best on a mower deck that does not use wheels or rollers supporting the deck for primary gauging. There are two primary approaches to setting the mower height: the first requiring the desired height to be set either manually or hydraulically (then adjusting the deck wheels to barely touch the ground, consigning the wheels to the function of preventing scalping, essentially bearing no weight); and the second which uses a so called "free-floating" deck where the wheels or rollers bear the weight of the mower deck and set the height of cut. Even though it will work with both types, the instant invention is best suited for use with the first type.

No novelty is claimed for the mower per se in this application, but the mower is shown in order to more easily and accurately disclose the present invention. The particular mower deck seen in the figures is a general depiction of a John Deere Model 445 Tractor with a 54-inch mower deck. Of course, the instant invention is not limited to use with only that mower or deck, it being understood that the invention will find application with substantially any mower deck to which the brush attachment can be mounted.

FIG. 1 shows a tractor 10, usually referred to as a "lawn" or "garden" tractor. Below the tractor and between the front and rear wheel axles 12, 14 is a mower deck 20, mounted to the tractor by linkages 22, 23 at the rear and 24 at the front that could be in any of a myriad of configurations—in the preferred embodiment depicted, the linkages 22, 23 are each pinned, respectively, to spaced apart substantially identical pairs of ears 21 which are affixed to the deck by suitable means such as welding (see FIG. 3). Deck 20 itself may be in substantially any design to function satisfactorily with the instant invention. Deck wheels 26 are shown in FIG. 1, and, though they are not necessary to the instant invention, they may be included in some deck designs. The mower deck 20 receives power from the tractor by direct drive, belt drive, hydraulic drive, or any of a multitude of known power transfer arrangements (not shown). The tractor is not only the source of power for the mower deck, but also provides motive power for movement of the tractor across the ground, forward to the right in FIG. 1 and rearward to the left. The height of the deck above the ground, whether moving from an operative to an inoperative position or to adjust the length of cut of the grass may be accomplished manually or with hydraulic assist (not shown).

FIGS. 8a and 8b show an embodiment of brush assembly 30 used with the instant invention, detached from the mower deck Brush assembly 30 is comprised of a single straight unit made up of bristles 32 secured at the top portion thereof by a full-length bristle clasp 34. In order to provide a convenient structure for mounting the brush to the deck, there are provided three regularly spaced mounting clasps 36–38, each with an opening therethrough so that a bolt 40 may be extended through the opening during assembly prior to the mounting clasp being attached to the bristle clasp 34. In this manner the bolts extend upwardly, and reasonably rigidly to mate with, as will be described further below, other structure to maintain the brush in position during operation. Bristle clasp 34 and mounting clasps 36–38 are tightly crimped during manufacture to the bristles in such manner as to create a more or less unitary brush assembly. While bolts are shown for mounting the brush assembly 30, any method of mounting may be used, so long as the proper position of the brush can be maintained during operation. In the alternative, brush 34 can be assembled in any of several ways that will be apparent to one of ordinary skill in the art, such as "sandwiching" the bristles between a pair of elongated straps forced into a unitary structure by a plurality of spaced bolts or rivets pulling the straps toward each other, without deviating from the teachings of the instant invention.

The bristles of the brush may be of any reasonably stiff and wear-resistant material, such as polypropylene, and may be of any suitable diameter. The bristles may also be made in any reasonably suitable length, the ones shown in the figures being approximately 3 inches in total length. Generally, lengths in the range of 1½ to 6 inches have been found acceptable, with the optimum being approximately 3 inches. It has also been found preferable, as will be discussed further below, that smaller (or finer), rather than larger, diameter bristles, with a thicker brush, work best. Additionally, the brush may be formed in more than one section; so long as a fairly consistent bending force is applied to the cut grass to maintain a uniform stripe. There are circumstances where a straight brush does not provide the most convenient structure for mounting to a mower deck. Such circumstances include those where the rear of the mower deck is not itself substantially straight. A brush can be made in a configuration matching the shape of the mower deck and attached in various known ways. In fact, as stated, a brush can be made to match substantially any configuration, with abrupt or gradual curves and corners, so long as it is generally co-extensive with the width of the mower deck. Moreover, as will be discussed further below, the brush can be made in multiple sections, for example, one section to extend between the wheels and a section on the outsides of the wheels—the wheels themselves push the grass down, essentially matching the effects of the brushes. It has further been discovered that with a 3 inch brush, the most favorable results are obtained with interference between the grass and the brush in the range of ¾ to 1 inch.

Generally, the largest practical width of mower deck used on a riding mower for stiping purposes is approximately 60 to 72 inches. It has been found advantageous for the larger equipment, for example, 54 plus inch decks, to employ not one, but two or more brushes to, among other things, keep the brushes within a practical range of lengths that encounter reduced stress and other damaging forces thereto. FIG. 2 shows two separate brushes 25 and 30, the former being attached to the wheel support 27 by a bracket 28, as best seen in FIG. 2b. As the wheel support is adjusted up and down for proper clearance, so too is brush 25 since it is attached to the support 27. The gap between brush 25, which is on the non-discharge side of the deck 20, and brush 30 is approximately the same width of the tires on the tractor. No brush is used on the discharge side of the mower deck (i.e., the side with the discharge chute 50 where cut grass is expelled) because it is not required. The tires will bend the grass to help form the stripe, and the discharge side of the deck moves along the line where the adjacent opposite stripe will be formed with some overlap of the mower. The number of separate brushes used is generally an issue of practicality and deck size and shape.

FIG. 2 also shows a useful configuration where the larger brush 30 is mounted to deck 20 such that the longitudinal center-line of the tractor generally coincides with the center of the brush. The wear on the brush is thus generally uniform, allowing the brush to be reversed at some point for extended use.

Directing attention to FIG. 4, the underside of the deck 20 can be seen to include three cutting blades 42–44 surrounded by a sheet metal deflection drape 46 designed and positioned to deflect cut grass and direct it toward opening 48 and out through discharge chute 50. In known manner, the cut grass may be either thrown to the ground or, more appropriately under the circumstances, vacuumed through discharge chute 50 into containers (not shown) on the rear of the tractor. Deck 20 further includes a formed or constructed deck mounting plate 52 with a plurality of spaced apertures 54 therethrough.

As can best be seen in FIGS. 3, 4, 5a and 5b, there is provided a deck mounting bracket 56 generally L-shaped in end view (FIG. 5b) and irregularly shaped in top plan view (FIG. 4). The irregularly-shaped portion of bracket 56 forms one leg of the L-shape and is provided with apertures 58 that match the pattern of apertures 54 in the deck mounting plate 52 such that bolts may be extended through the apertures of the two pieces to form a rigid connection between the two. The other leg of the L-shape is formed with two substantially identical spaced-apart mounting ears 60, 62 each having an elongate vertical slot 64 therethrough.

FIGS. 7a and 7b show an L-shaped brush-mounting bracket 70 with two substantially parallel vertical rows of uniformly spaced-apart mounting holes 72, 74 through one leg thereof. The other leg of the L-shaped bracket has three apertures 76–78 therethrough matching the mounting bolts 40 on brush assembly 30 such that the bolts 40 may be extended through apertures 76–78 and rigidly affixed to the bracket by lock washers and nuts. As will be discussed immediately below, FIGS. 6a and 6b show a pair of plastic knobs 84, 86 that are hand-tightened onto bolts 80, 82 to quickly and easily make fine and gross vertical adjustments of the brush assembly.

Thus, as clearly seen in FIGS. 2 and 3, the deck mounting bracket 56 is bolted to the deck mounting plate 52, brush assembly 30 is bolted to the brush-mounting bracket 70 which is adjustably affixed to the deck mounting bracket 56 by a pair of bolts 80, 82 held in place by hand-tightened knobs 84, 86. Bolts 80, 82 extend through selected aligned holes 72, 74 in brush mounting bracket 70 and respective slots 64 through deck mounting bracket 56 such that the operator may adjust the height of the bristles 32, or, more accurately, the brush is intended to be adjustable upwardly and downwardly to vary the contact between the bristles 32 and the cut grass, thus varying the bend applied to the cut grass and the resultant striping effect.

It has been discovered that the bristles of the brush will take a set if left for an extended period of time in contact with the ground and bent, such as shown in FIG. 3, i.e., the brush becomes generally permanently bent if held in a bent condition such as shown in FIG. 3. This is, of course, a significant practical problem in that it results in either the need for premature and costly replacement of the brush or a reduction in performance of the striping process, or both. To avoid this issue, the preferred embodiment permits the easy and ready loosening of bolts 80, 82 by the hand-turning of knobs 84, 86, allowing the kinetic energy in the flexed bristles 32 of the brush to "lift" the brush mounting bracket 70 to a point where the bend in the bristles is negligible. This approach is particularly useful and beneficial when the hydraulics of the tractor tend to "leak", allowing the deck to fall over time when not being used.

Another problem encountered by the striping process is that the mower may "jump" due to the "flipping" of the bend in the bristles when the direction is reversed. In seeking solutions to this problem it was found that by making a thicker brush from finer bristles reversal of the tractor bends, or flexes the bristles in the opposite direction without causing the mower to "jump". More particularly, by controlling the overall effects of individual bristle diameter, stiffness and length, the brush thickness and the amount of interference between the brush and the cut grass, it is possible to adequately bend the cut grass and allow the brush bristles to reverse without the "jumping" effect. To this end, a brush with a nominal thickness of about ½ inch (thickness can be seen in the side an bottom views of the brush, such as FIGS. 1, 3, 4, 8a and 8b) with oval-shaped bristles 0.016×0.019 inches best meets all of the operational objectives. While an oval shape has been described herein as preferred, it should be understood that an acceptable brush can be made with bristles having a diamond or other-shaped cross-section as well.

Figure 9:
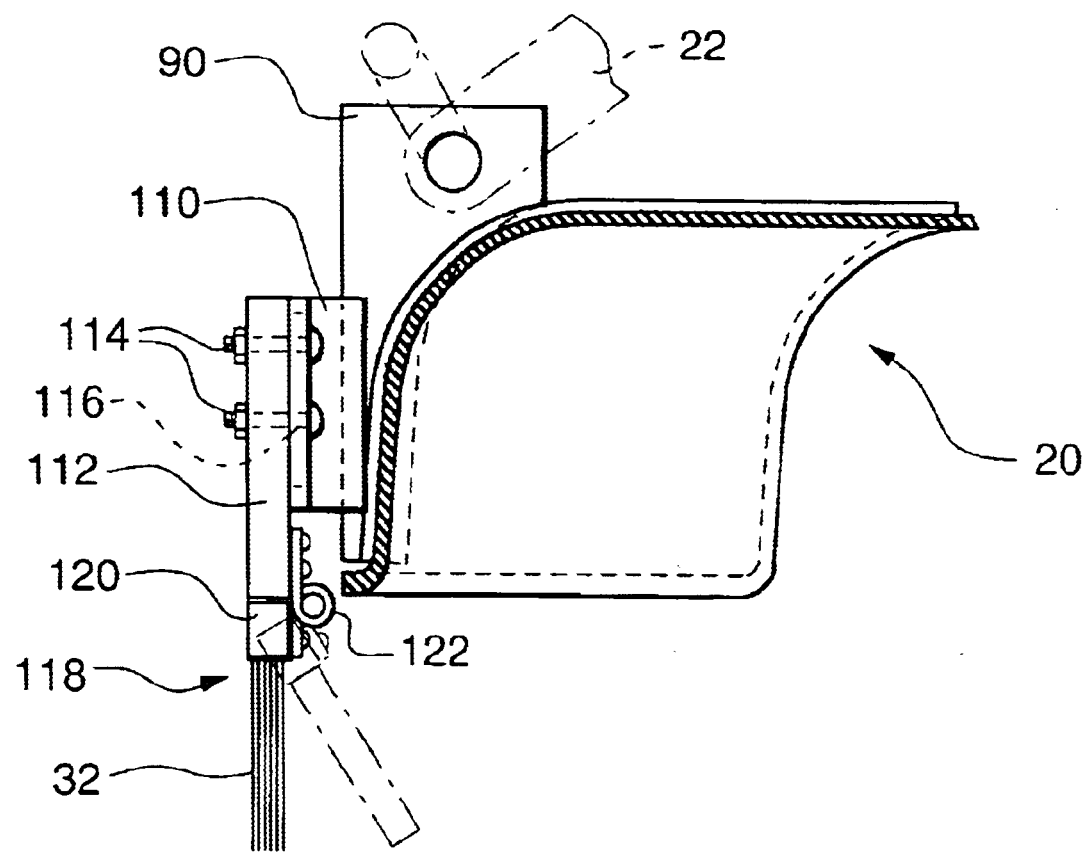
FIG. 9 is a cross-sectional view, similar to FIG. 3, of a portion of the mower deck and brush mounting, showing an alternative structure for mounting the brush to the deck.

The second embodiment depicted in FIG. 9 addresses the tractor reversal, or "jumping", issue in different ways. Relatively small L-shaped bracket plates 110 are affixed one to each of the ears 90 as by welding. An elongate rigid strap 112 is then affixed across the rear of deck 20 to each of the bracket plates 110 with bolts 114 extending through an adjustment slot 116 in respective bracket plates. The strap 112, and thus the brush as will be seen, may be moved vertically to adjust its position relative to the ground. The brush assembly 118 is comprised of bristles 32 held together by a clasp 120 extending the full length of the brush assembly 118. As with earlier described brush assemblies, the bristles may be held together by crimping, or glue or other suitable mechanisms. The brush assembly 118 is affixed to strap 112 by an elongate hinge 122 that permits the brush assembly to pivot forwardly as shown in FIG. 9. Thus, when the tractor is moving forward to the right in FIG. 9, the brush is in the vertical operative position, and when the tractor is moving in the reverse direction, the brush assembly is free to pivot as shown in phantom. The clasp 120 abuts strap 112 is such a manner as to stop the brush assembly from pivoting further than the vertical when the tractor is moving forward. The bolts 114 and slots 116 provide a mechanism for adjusting the interference between the bristles 32 and the cut grass or ground. A single hinge may be used or a plurality of hinges, one at each ear 90 for instance, to provide the required brush disengagement.

The striping effect can be attained by a broad range of settings of the brush relative to the cut grass; however, the best effect has been found to result when the brush engages the cut grass with an overlap in the range of three-quarters to one inch.

Many conventional mower elements or accessories known and used under normal circumstances have not be shown or discussed, but certainly would be employed under normal operating conditions.

It will be understood that changes in the details, materials, steps and arrangements of parts which have been described and illustrated to explain the nature of the invention will occur to and may be made by those skilled in the art upon a reading of this disclosure within the principles and scope of the invention. For instance, the discussion above is directed primarily to brushes that are generally perpendicular to the direction of travel of the tractor; however, it may prove advantageous in some particular situations to angle the brush(es) relative to the direction of travel. The foregoing description illustrates the preferred embodiment of the invention; however, concepts, as based upon the description, may be employed in other embodiments without departing from the scope of the inventions.

Accordingly, the following claims are intended to protect the invention broadly as well as in the specific form shown.

Having thus described the invention, what is claimed is:

1. In a mechanism for mowing a lawn of grass to remove grass clippings therefrom and imparting a semi-permanent substantially uniform bend to the cut grass, the mechanism including a wheel-supported frame adapted for movement in forward and rearward directions over generally smooth ground having grass thereon, a source of power at least partial supported on the frame, a cutting device supported on the frame and drivingly connected to the power source such that a swath of cut grass having a generally uniform width substantially equal to the width of the cutting device is created, the improvement comprising:

at least one brush including a generally continuous array of bristles of generally uniform size and shape, thickness, length and flexibility affixed to the cutting device, the brush being located rearward of the cutting device and extending generally across the swath of cut grass, the brush further being adjustable vertically relative to the cutting device such that the bristles may be adjusted into interference with the swath of cut grass in the range of ¾ to 1 inch, and not in interference with the ground, whereby the bristles flex rearwardly when traveling in the forward direction and impart a forward bend to the swath of cut grass, and flex forwardly without raising the wheel-supported frame when the direction of travel is changed to reverse.

2. The improvement of claim 1, wherein:

the cutting device comprises at least one generally horizontally rotatable cutting blade, the cutting blade supported within an open-bottomed enclosure and defining the width of the swath of cut grass and an outside edge thereof; and the brush is affixed to the enclosure.

3. The improvement of claim 2, wherein: the bristles of the brush are in the range of 1½ to 6 inches in length.

4. The improvement of claim 3, wherein:

the bristles are made of polypropylene.

5. The improvement of claim 3, wherein:

the mechanism for mowing is a four-wheeled lawn tractor and the cutting device is a mower deck with at least two mower blades, the mower deck having two opposing sides each of which includes at least one deck wheel assembly, vertically adjustable relative to said at least two mower blades, and one of which includes a discharge chute through which grass clippings are ejected.

6. The improvement of claim 5, wherein:

the lawn tractor has a longitudinal center-line; and at least two of the four wheels of the lawn tractor are rearward of the mower deck and the brush and are spaced apart from each other generally equidistant from the longitudinal center-line of the tractor, one of the at least two wheels being generally adjacent the discharge chute of the mower deck and the other remote therefrom.

7. The improvement of claim 6, wherein:

the at least one brush comprises first and second brushes;

the first brush located forward of the two wheels rearward of the mower deck and generally perpendicular to the planes of rotation thereof when the tractor is moving forward in a generally straight line; and the second brush extending generally parallel to the first brush and also located forward of the two wheels rearward of the mower deck, the second brush extending from the wheel adjacent the discharge chute of the mower deck to the outside edge of the swath of cut grass, neither of the first and second brushes located significantly in the path of either of the wheels rearward of the mower deck.

8. The improvement of claim 7, wherein:

said second brush is affixed to said deck wheel assembly remote from said discharge chute, whereby vertical adjustment of said deck wheel assembly also vertically adjusts said second brush.

9. The improvement of claim 8, wherein:

the bristles are made of polypropylene.

10. The improvement of claim 2, wherein:

the brush is adjustably affixed to the enclosure by at least two spaced-apart hand manipulated knobs, whereby the brush may be vertically adjusted with relative ease by an operator.

11. A mechanism for mowing a lawn of grass to remove grass clippings therefrom and imparting a semi-permanent substantially uniform bend to the cut grass, the mechanism comprising:

a frame having a front end defining a forward direction, and an opposing rear end defining a rearward direction, said frame being supported by a pair of steerable front wheels and a pair of rear wheels;

an engine supported on said frame and adapted to provide motive power to move the mechanism for mowing grass across the ground in said forward and rearward directions;

a cutting device supported by said frame and including an open-bottomed enclosure with generally horizontal rotatable cutting blades supported therein, said engine providing power to said cutting blades, said cutting blades defining a swath of cut grass with opposing edges corresponding to the edges of the swath of cut grass; and at least one brush affixed to said enclosure rearwardly of the cutting device and having a generally continuous array of bristles of a generally uniform thickness, length and flexibility, said at least one brush being vertically adjustable relative to said enclosure into interference with the swath of cut grass in the range of ¾ to 1 inch and not in interference with the ground, and having a brush width confined by said opposing edges, whereby said bristles flex rearwardly when traveling in said forward direction and impart a forward bend to the swath of cut grass, and flex forwardly without raising said wheels off the ground when the direction of travel is changed to said rearward direction.

12. The mechanism for mowing a lawn of grass of claim 11, wherein:

said enclosure is a mower deck having two opposing sides each of which includes at least one deck wheel assembly, vertically adjustable relative to said cutting blades, and one of which includes a discharge chute through which grass dippings are ejected.

13. The mechanism for mowing a lawn of grass of claim 12, wherein:

said mechanism for mowing grass has a longitudinal center-line;

said pair of rear wheels are located rearward of said mower deck and brush and are spaced apart from each other generally equidistant from the longitudinal center-line of the tractor, one of the at least two wheels being generally adjacent said discharge chute of said mower deck and the other remote therefrom; and said at least one brush comprises first and second brushes.

14. The mechanism for mowing a lawn of grass of claim 13, wherein:

said first brush is located forward of said rear wheels rearward of the mower deck and generally perpendicular to the planes of rotation of said rear wheels when the mechanism for mowing is moving forward in a generally straight line; and said second brush extends generally parallel to said first brush and is also located forward of said rear wheels rearward of the mower deck, said second brush extending from said plane of rotation of said wheel adjacent the discharge chute of the mower deck to the edge of the swath of cut grass remote from said discharge chute.

15. The mechanism for mowing a lawn of grass of claim 14, wherein: the bristles of said brushes are in the range of 1½ to 6 inches in length.

16. The mechanism for mowing a lawn of grass of claim 15, wherein:
said second brush is affixed to said deck wheel assembly remote from said discharge chute, whereby vertical adjustment of said deck wheel assembly also vertically adjusts said second brush.

17. The mechanism for mowing a lawn of grass of claim 12, wherein:
said second brush is affixed to said deck wheel assembly remote from said discharge chute, whereby vertical adjustment of said deck wheel assembly also vertically adjusts said second brush.

18. A mechanism for mowing a lawn of grass to remove grass clippings therefrom and imparting a semi-permanent substantially uniform bend to the cut grass, the mechanism comprising:
a frame having a front end defining a forward direction, and an opposing rear end defining a rearward direction, said frame being supported by a pair of steerable front wheels and a pair of rear wheels;
an engine supported on said frame and adapted to provide motive power to move the mechanism for mowing grass across the ground in said forward and rearward directions;
a cutting device supported by said frame and including an open-bottomed enclosure with generally horizontal rotatable cutting blades supported therein, said engine providing power to said cutting blades, said cutting blades defining a swath of cut grass with opposing edges corresponding to the edges of the swath of cut grass; and
at least one brush assembly affixed to said enclosure rearwardly of the cutting device, said brush comprising:
an elongate generally straight bracket member and a brush member hinged thereto such that said brush member may pivot in a forward arc when the mechanism for mowing grass moves in a rearward direction and may pivot to a generally vertical position when the mechanism for mowing grass moves in a forward direction;
said brush member having a generally continuous array of bristles of a generally uniform thickness, length and flexibility, said brush assembly being vertically adjustable relative to said enclosure into interference with the swath of cut grass in the range of ¾ to 1 inch and not in interference with the ground, and having a brush length confined by said opposing edges, whereby said bristles flex rearwardly when traveling in said forward direction and impart a forward bend to the swath of cut grass, and pivot in said forward arc without raising said wheels off the ground when the direction of travel is changed to said rearward direction.

19. The mechanism for mowing of claim 18, wherein:
said bracket member is adjustably affixed to the enclosure by at least two spaced-apart hand manipulated knobs, whereby the brush may be vertically adjusted with relative ease by an operator.

20. A method of mowing a lawn of grass and imparting a semi-permanent substantially uniform bend to the cut grass, comprising the steps of:
a. providing a mower having a front end defining a forward direction, and an opposing rear end defining a rearward direction, the mower supported by a plurality of ground-engaging wheels and including a cutting mechanism for cutting grass to a selective length, a source of motive power to move the mower across the ground in said forward and rearward directions and to empower the cutting mechanism;
b. providing an elongate brush assembly having a generally continuous array of bristles of a generally uniform thickness, length and flexibility and affixing it at the rear of the cutting mechanism such that it is vertically adjustable into interference with the cut grass in the range of ¾ to 1 inch, and not in interference with the ground;
c. adjusting the cutting mechanism to cut the grass to a selective length;
d. adjusting the brush assembly so that the bristles engage the cut grass and flex rearwardly when the mower is moving in the forward direction and impart a forward bend to the cut grass; and
e. not allowing the ground-engaging wheels of the mower to raise off the ground when the direction of travel is reversed.

21. The method of claim 20, further including the step of:
selecting the material, diameter, thickness and length of the bristles of the brush such that the bristles flex rearwardly when traveling in the forward direction, and flex forwardly without raising the ground-engaging wheels when the direction of travel is changed to reverse.

22. The method of claim 21, further including the step of:
selecting polypropylene as the bristle material, and the length in the range of 1½ to 6 inches.

23. The method of claim 22, further including the step of:
selecting the length of the bristles as approximately 3 inches.

24. The method of claim 20, wherein:
the brush assembly comprises:
an elongate generally straight bracket member and a brush member hinged thereto such that the brush member may pivot in a forward arc when the mechanism for mowing grass moves in a rearward direction and may pivot to a generally vertical position when the mechanism for mowing grass moves in a forward direction, whereby the bristles flex rearwardly, and pivot in the forward arc without raising the ground-engaging wheels off the ground when the direction of travel is changed to the rearward direction.

* * * * *